Patented July 27, 1943

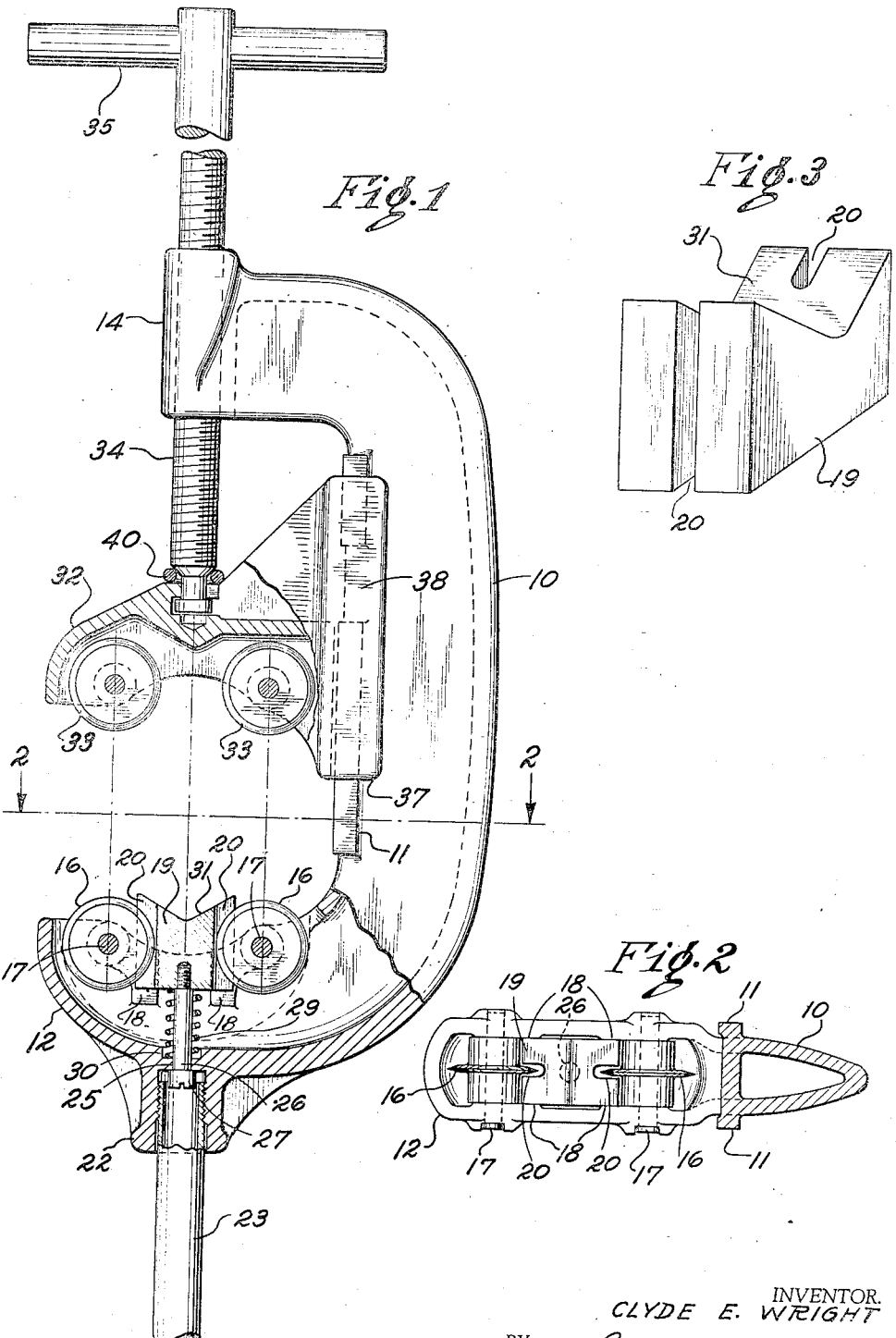

2,325,353

UNITED STATES PATENT OFFICE 2,325,353

PIPE CUTTER

Clyde E. Wright, Elyria, Ohio, assignor to The Ridge Tool Company, North Ridgeville, Ohio, a corporation of Ohio Application April 3, 1942, Serial No. 437,583

5 Claims. (Cl. 30—102)

This invention relates to pipe cutters and more specifically to mechanism for aligning the cutting members in a plane normal to the axis of a pipe.

Heretofore in the construction of pipe cutters one of the ultimate objectives has been to obtain a square and even cut upon a pipe or tubular object. With this end in view certain efforts have been directed by the prior art workers to the assembly of the cutting members and guides upon the frame of the pipe cutter in an endeavor to procure a cutting course at right angles to the axis of the pipe. However, the cutting course obtainable with the prior art devices is more aptly termed a helical one resulting in the pipe being cut on a bias. It has been found from experience that pipes severed in such a manner not only constitute a hindrance to the free operation of a threading tool but often mar or damage the tool.

In the structure of the present invention the cutting members are provided with a guide plate which is so arranged as to insure the cutting members following a circular cutting course disposed at right angles to the axis of the pipe.

One of the objects of the present invention is to construct a pipe cutter having suitable mechanism associated therewith which enables the cutting members to engage a pipe at diametrically opposite points.

Another object of the invention resides in the provision of a pipe cutter having a spring actuated guide plate engageable with a pipe for aligning the cutting members in a plane normal to the axis of the pipe.

Further objects of the invention are to construct a pipe cutter that is simple and compact, relatively light in weight, economic of manufacture and reliable and efficient in operation.

Other objects and advantages more or less ancillary to the foregoing and the manner in which all the various objects are realized will appear in the following description, which considered in connection with the accompanying drawing, sets forth the preferred embodiment of the invention.

Referring to the drawing wherein a preferred embodiment of the invention is illustrated:

Fig. 1 is a side elevational view of the improved pipe cutter with a portion thereof shown in section in the interest of clarity;

Fig. 2 is a transverse sectional view of one end of the improved cutter, the view being taken on a plane indicated by line 2—2 of Fig. 1; and Fig. 3 is a perspective view of the guide plate.

As shown in Fig. 1, the pipe cutter comprises a frame or bed 10 having longitudinally extending flanges 11 formed on the sides. A standard is formed at the ends of the frame in a plane normal thereto with one of the standards constituting a housing or pocket 12 and the other an internally threaded boss 14.

A pair of spaced cutting wheels 16 are rotatably journaled upon pins 17 which are secured within the housing 12. A portion of the cutting wheels 16 is arranged to project beyond the housing 12 to facilitate their engagement with a pipe or tubular object. The sides of the housing 12 are machined to provide ways 18 for the reception of a guide block 19 which is disposed between the pins 17. The guide block 19, Figs. 2 and 3, is formed with slots or recesses 20 to provide a clearance space for the cutting wheels 16. The recesses 20 enable the guide block to be advanced or retracted longitudinally of the frame 10 between the cutting wheels without restricting the rotative movement of the cutting wheels.

Formed on the peripheral surface of the housing 12 there is an abutment defining a socket 22 which is disposed in alignment with the internally threaded boss 14. A tubular rod 23 is threaded within a portion of the socket and provides a handle by which the pipe cutter may be rotated about a pipe. A restricted aperture 25 is formed in the base of the socket 22 through which a stud 26 projects into the interior of the housing 12. An enlarged head 27 is formed on the end of the stud within the socket 22 to limit the movement of the stud into the housing, while the other end of the stud is threaded within the guide block 19. A coil spring 29 is disposed about the stud 26 between the guide block 19 and a recess 30 formed in a portion of the frame 10 defining the housing 12. The spring 29 urges the guide block 19 longitudinally of the frame 10 and in its extended position moves the forward face of the guide plate beyond the outer edge of the cutting wheels. The forward face 31 of the guide block 19 is provided with a V-shaped face to facilitate its engagement at spaced points on the periphery of various sizes of pipes.

A cross head or slide 32, having a pair of vertically spaced cutting wheels 33, rotatably journaled therein, is slidably mounted on the frame 10 between the housing 12 and boss 14. A screw threaded bar or rod 34 having a handle 35 formed thereon extends through the boss 14 and engages the slide 32. Upon the rotation of the handle 35 and rod 34 the slide 32 will be advanced and retracted along the frame 10 with respect to the housing 12. The slide 32 is provided with depending lips 37 of a configuration complemental to the flanges 11 of the frame 10 which insure the retention of the slide 32 upon the frame. The portion of the flanges 11 adjacent the boss 14 is provided with recesses 38 through which the depending lips 37 of the slide are moved to facilitate the engagement or disengagement of the slide with the frame 10. A snap ring 40 mounted on the rod 34 adjacent the slide 32 engages the boss 14 to limit the rearward movement of the slide upon the frame. The engagement of the ring 40 with the boss 14 prevents the lips 37 from moving into alignment with the recesses 38 of the flanges 11 and the subsequent disengagement of the slide from the frame 10.

In the use of the improved pipe cutter the forward face 31 of the spring pressed guide block 19 is advanced by the spring 29 beyond the cutting wheels 16 where the opposite faces 31 provide a tangent engagement with a pipe or tubular object on spaced points on its periphery. Since the faces 31 of the block 19 although being V-shaped are horizontal in the transverse direction or extend in a plane normal to the longitudinal axis of the device it will be seen that the engagement of the block with the pipe will insure that the tool engages the pipe at right angles to the axis of the pipe. The block thus serves as a guide for insuring correct alignment of the tool with the pipe. Upon the engagement of the guide block 19 with the pipe the handle 35 and rod 34 are rotated to advance the slide 32 longitudinally of the frame 10 and move the cutting wheels 33 into engagement with the pipe on the opposite side to the guide block. The continued rotation of the handle 35 will tend to draw the housing 12 together with the cutting wheels 16 towards the slide 32, the guide block 19 sliding in the ways or grooves 18 into the housing against the pressure of the spring 29 which holds the plate firmly in engagement with the pipe and thus holds the tool in proper alignment with the pipe during the advancing of the cutters. As the guide plate is forced into the housing the cutting wheels 16 will engage the pipe at points opposite to the engagement of the cutting wheels 33. Upon the engagement of the cutting wheels 16 and 33 with the pipe the frame 10 will be rotated about the pipe by the handle 35 and rod 23 to effect the severance of the pipe. At certain intervals in the rotation of the frame 10 about the pipe the rod 34 and handle 35 are rotated to continuously force the cutting wheels into the pipe. During the rotation of the frame 10 the engagement of the guide block 19 with the pipe is such as not to interfere with the cutting action of the wheels 16 and 33. When the guide block 19 is forced into the housing 12 the enlarged head 27 of the stud 26 will slide within the tubular rod 23. The machined ways 18 in the housing 12 and the portion of the frame 10 defining the restricted aperture 25 in the base of the socket 22 through which the stud 26 reciprocates insure the proper positioning and alignment of the guide block at all times.

The engagement of the guide block 19 with the pipe prior to the advancement of cutting wheels positions the frame 10 and cutting wheels 16 and 33 in a plane normal to the axis of the pipe. By so positioning the frame and cutting wheels with respect to the pipe the rotation of the handle 35 will move the cutting wheels 16 and 33 into engagement with the pipe at diametrically opposite points and thus assure the severance of the pipe with a square and even cut. The engagement of the cutting wheels 16 and 33 with the pipe at diametrically opposite points permits the frame 10 to follow a circular cutting course at right angles to the axis of the pipe. Such an arrangement overcomes any tendency of the pipe cutter to sever the pipe on a bias and thereby facilitates the subsequent threading of the severed end of the pipe.

With a pipe cutter of the present design the frame 10 may be suspended from a horizontally disposed pipe through the engagement of the face 31 of the guide block 19 with the pipe. By suspending the frame 10 from a pipe the spring pressed guide block will position the cutting wheels in a plane at right angles to the axis of the pipe so that the cutting wheels will engage the pipe at diametrically opposite points.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A pipe cutter comprising a frame having integral standards at the ends with one of the standards constituting a pocket and the other an internally threaded boss, a pair of spaced cutting wheels rotatably journaled in the pocket with a portion of the wheels projecting beyond the pocket, a guide slidably mounted in ways formed in the pocket between the cutting wheels, a spring disposed between said block and said housing and pressing the block, said guide provided with recesses in the faces adjacent the cutting wheels to facilitate the advancement of the guide beyond said wheels, a slide mounted on said frame and having a pair of spaced cutting wheels rotatably journaled therein, said guide having a face configured for engagement with a pipe to position the pipe cutter in a plane normal to the axis of the pipe.

2. A pipe cutter comprising a frame having standards at each end with one of the standards constituting a pocket and the other an internally threaded boss, a pair of cutting wheels journaled in said pocket, a guide slidably mounted in ways formed in the portion of the pocket between said wheels, a spring disposed between said block and said housing and pressing the block, a slide having cutting wheels journaled therein mounted on said frame, a screw in the boss engageable with said slide to advance the slide and cutting wheels therein towards said pocket, a portion of said guide adapted to extend beyond said wheels in said pocket and having a face configured for engagement with a pipe whereby the complementary cutting wheels in the pocket and slide will engage the pipe at diametrically opposite points.

3. A pipe cutter comprising a frame having vertical standards formed at each end with one of the standards constituting a housing and the other an internally threaded boss, a pair of vertically spaced cutting wheels rotatably journaled on studs secured in the housing with a portion of the wheels projecting from the housing, said housing formed with ways between the studs, a guide block of a thickness greater than that of said wheels mounted in the ways in the plane of the wheels, said guide block having recesses in opposed faces to provide clearance space for the cutting wheels, said frame provided with a socket on the housing in alignment with the boss, a bolt extending through an aperture in the base of the socket and engageable with said guide block, a coil spring on said bolt intermediate the block and housing to facilitate the advancement and retraction of the block with respect to the wheels, a slide on said frame having a pair of cutting wheels disposed in aligned relation with the wheels in the housing, a screw extending through the boss and engageable with said slide, said guide adapted to extend beyond the wheels in the housing to engage a pipe whereby the cutting wheels in the housing and slide will be disposed in a plane normal to the axis of the pipe.

4. A pipe cutter comprising a frame having an internally threaded boss at one end and a pair of vertically spaced cutting wheels rotatably journaled in the other end, said frame provided with ways between the cutting wheels, a guide block of a thickness greater than the wheels mounted in the ways for movement longitudinally of the frame, a spring disposed between the block and the housing and in engagement with the block, a slide mounted on the frame and having a pair of vertically spaced cutting wheels disposed in aligned relation with the cutting wheels in said frame, said guide block extending beyond the cutting wheels in said frame and engageable with a pipe to effect the subsequent engagement of the cutting wheels in said frame and slide with the pipe at diametrically opposite points.

5. A pipe cutter comprising a frame having a standard formed at each end with one of the standards constituting a housing and the other an internally threaded boss, a pair of spaced cutting wheels rotatably journaled in the housing, a guide block mounted in the housing in the plane of the wheels and adapted to move longitudinally of the frame, a spring disposed between the block and the frame and resiliently engaging the block, flanges formed on the sides of the frame and extending from one standard to the other, said flanges having recesses formed therein adjacent the internally threaded boss, a slide having depending lips thereon of a configuration complemental to said flanges, said slide adapted to be mounted on the frame with the lips projecting into the recesses of the flanges to facilitate their engagement therewith, a screw extending through the boss and engageable with said slide, a snap ring on said screw intermediate the boss and slide, said ring being adapted to engage the boss upon the retraction of the screw to insure the retention of the slide upon said frame, a pair of vertically spaced cutting wheels journaled in said slide, said guide block having a face extending beyond the cutting wheels in the housing and configured for engagement with a pipe to hold said frame at right angles to the pipe and align said cutting wheels in a plane normal to the axis of the pipe whereby said cutting wheels will engage the pipe at diametrically opposite points upon the actuation of said screw contemporaneous the retraction of the slide within the housing.

CLYDE E. WRIGHT.